United States Patent
Barlow et al.

(10) Patent No.: US 8,963,088 B2
(45) Date of Patent: Feb. 24, 2015

(54) PASSIVE INFRARED RANGE, SIZE, AND DIRECTION FINDING PROXIMITY DETECTOR

(71) Applicant: Excelitas Technologies Singapore Pte. Ltd., Singapore (SG)

(72) Inventors: Arthur John Barlow, Alton (GB); Stefan Naumann, Dreieich (DE)

(73) Assignee: Excelitas Technologies Singapore Pte. Ltd., Singapore (SG)

(*) Notice: Subject to any disclaimer, the term of this patent is extended or adjusted under 35 U.S.C. 154(b) by 0 days.

(21) Appl. No.: 14/333,810

(22) Filed: Jul. 17, 2014

(65) Prior Publication Data

US 2014/0326888 A1 Nov. 6, 2014

Related U.S. Application Data

(62) Division of application No. 13/402,020, filed on Feb. 22, 2012.

(51) Int. Cl.
G01J 5/02 (2006.01)
G01J 5/00 (2006.01)

(52) U.S. Cl.
CPC .................................. *G01J 5/0025* (2013.01)
USPC .................................. 250/338.4; 250/339.14

(58) Field of Classification Search
USPC .............. 250/330, 338.1, 338.4, 339.14, 340, 250/341.8, DIG. 1
See application file for complete search history.

(56) References Cited

U.S. PATENT DOCUMENTS

| | | |
|---|---|---|
| 5,249,128 A | 9/1993 | Markandey |
| 6,791,087 B1 | 9/2004 | Okumura |
| 7,599,044 B2 | 10/2009 | Hotelling et al. |
| 2005/0226532 A1 | 10/2005 | Thompson |
| 2007/0103671 A1 | 5/2007 | Ash |
| 2007/0210953 A1 | 9/2007 | Abraham |

(Continued)

FOREIGN PATENT DOCUMENTS

| | | |
|---|---|---|
| DE | 102008024308 A1 | 12/2009 |
| DE | 102012107739 A1 | 3/2014 |
| EP | 1180324 A1 | 2/2002 |

OTHER PUBLICATIONS

Nikolai Haslebner; ams Preliminary Datasheet, Confidential: YYYY-Mmm [0-00] AS7500-15, Apr. 22, 2014.

(Continued)

*Primary Examiner* — Mark R Gaworecki
(74) *Attorney, Agent, or Firm* — Peter A. Nieves; Sheehan Phinney Bass + Green PA (57) ABSTRACT

Apparatus and methods for proximity detection include a passive proximity detecting device for detecting humans within a detection area and controlling a controlled device. A sensor includes a plurality of pixels arranged in a substantially contiguous array. Each pixel is configured to detect infrared radiation emitted by an object in a predetermined temperature range within the detection area. In response to detecting the object a detection signal is generated having a signal level proportional to the infrared radiation emitted by said object received by the sensor. A processor in communication with the sensor is configured to receive said detection signal, to derive an object distance and a second object parameter using, a signal level of the detection signal.

25 Claims, 10 Drawing Sheets

(56) References Cited

U.S. PATENT DOCUMENTS

| | | | |
|---|---|---|---|
| 2007/0279215 | A1 | 12/2007 | Tomooka et al. |
| 2008/0142716 | A1 | 6/2008 | Wong |
| 2011/0010572 | A1 | 1/2011 | Chen |
| 2012/0153868 | A1 | 6/2012 | Gu et al. |

OTHER PUBLICATIONS

Pyreos, Thin Film Pyroelectric IR Gesture Sensor Demonstrator Kit, User guide Version 1.0; Feb. 20, 2012.

Pyreos, Passive Infrared Gesture Sensor, datasheet version 1.0 PY1594, dated 2014.

Cool Eye Thermopile Array Modules With Integral Optics for Safety and Security, web article: TPiL 08T 2146 L3.9, TPiA 16T 4146 L3.9 Thermopile Array "Cool Eye," ww.excelitas.com, pp. 39-44, 2011.

Samsung Electronics Co. Ltd.; Gesture Sensor for Mobile Devices; http://www.techonline.com/electrical-engineers/education-training/tech-papers/4420524/Gesture-Sensor-for-Mobile-Devices, downloaded Oct. 2013.

Datasheet, IR Sensing Solutions, Digipile Family, web article: "Digital Thermopile" www.excelitas.com, Digipile family May 31, 2011, p. 1-4.

PASSIVE INFRARED RANGE, SIZE, AND DIRECTION FINDING PROXIMITY DETECTOR

CROSS-REFERENCE TO RELATED APPLICATIONS

This application is a divisional application of and claims the benefit of U.S. non-provisional patent application Ser. No. 13/402,020, filed Feb. 22, 2012, entitled "Passive Infrared Range Finding Proximity Detector," which is incorporated by reference herein in its entirety.

FIELD OF THE INVENTION

The present invention relates to proximity detectors, and more particularly, is related to infrared sensing proximity detectors.

BACKGROUND OF THE INVENTION

Proximity detectors determine the presence or absence of objects within the detection area of a presence sensor. A common use for a proximity detector includes detecting the presence of a person in a room to control a lighting fixture. Ideally, such a proximity detector determines when a person moves within a range of distances from the sensor, called an activation region, and activates the lighting fixture. Conversely, when the person moves out of the activation region, the lighting fixture is deactivated, often after a specific time delay.

Proximity detectors often measure the distance between an object and a sensor, for example, using time-of-flight calculations of a reflected pulse of light or sound, or angle-of-light detection. These are emitter-detector systems, where the detector emits a signal and a sensor detects characteristics of a received reflection of the signal. While such emitter-detector systems may determine the difference between a moving and a stationary object, they typically cannot distinguish an immobile person from an inanimate object, for example, a cardboard box. In this situation, if the detector is activated entirely by detecting the presence or absence of an object within an activation region, the light fixture of the previous example may remain illuminated if, for example, the cardboard box remains in the activation region after all persons have departed. Some proximity detector circuits may compensate for this deficiency by using timing circuits, for example, deactivating a lighting fixture when no motion is detected within the activation region over a period of time. However, this may result in deactivation of the lighting fixture when a person remains immobile within the activation region.

There are other examples where a traditional proximity detector may be inadequate. For example, a cat scampering across a room or a housefly flying past the sensor may trigger an unwanted change of state by the proximity detector.

It may be desirable for a proximity detector to have a configurable range. For example, a proximity detector used to activate and deactivate a computer monitor based on the detected proximity of a user may ignore a detected object located over five feet away from the monitor, but be activated by a detected object between one and five feet from the monitor. Another example is a smart-phone, where it may be desirable to de-activate and dim a touch sensitive screen when a user places the phone against his ear, but to re-activate the touch sensitive screen when the user moves the phone away from his ear. An additional example is a smart phone or other computational device, where hand or finger or body movements (gestures) are interpreted as commands to control the device.

The amount of energy used by an emitter-detector based proximity detector may also be problematic, as the emitter must expend energy by regularly generating signal pulses and receiving reflections to determine if a change has occurred within the activation region. For example, such power consumption concerns may be higher for battery powered devices. In addition, the signals generated by the emitter-detector may interfere with other electronic equipment operating nearby. Also, proximity detectors based on sensing visual spectrum or Near-infrared light may falsely trigger based on changes in ambient light, for example sunlight reflected through a window, or light from headlights of a moving car through a window.

Therefore, there is a need in the industry for a proximity detector that addresses the abovementioned shortcomings.

SUMMARY OF THE INVENTION

Embodiments of the present invention provide a passive infrared range, size, and direction finding proximity detector. Briefly described, the present invention is directed to a sensor having a plurality of pixels arranged in a substantially contiguous array. Each pixel is configured to detect infrared radiation emitted by an object in a predetermined temperature range within the detection area. In response to detecting the object a detection signal is generated having a signal level proportional to the infrared radiation emitted by said object received by the sensor. A processor in communication with the sensor is configured to receive said detection signal, to derive an object distance and a second object parameter using, a signal level of the detection signal.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, "a controlled device" is a device that may have one or more states determined by the range/position-finding proximity detector. The controlled device may be a device external to the range finding proximity detector, or it may be a device that incorporates the range finding proximity detector. An example of a controlled device may be a switchable light fixture.

As used within this disclosure, a "state" is a configurable condition. For example, a simple light switch may have two states, on and off, while a more complex light may have, for example, four states, such as off, low intensity, medium intensity, and high intensity. Another example is to determine appropriate commands to a controlled device based on the position or distance of the human object.

As used within this disclosure, a "warm object" is an object substantially the temperature of a healthy human being, approximately 98.6 degrees Fahrenheit, plus or minus a deviation range, for example, but not limited to, ten or twenty degrees Fahrenheit, depending upon the human's skin temperature, clothing temperature, or other detected temperatures.

The term "detection area" as used herein refers to a space in the vicinity of a proximity detector wherein a presence sensor may detect the presence of an object. The detection area may be physically bounded, for example, by a floor or a wall, or the detection area may not be physically bounded, but instead defined as a range of distances from the proximity detector. The detection area may be bounded according to the entire (maximum) detection range limitation of the presence sensor, or may be a smaller area defined within the maximum detection range of the presence sensor.

The term "presence sensor" as used herein refers to a device capable of sensing an object. A presence sensor may provide Boolean results, for example, whether an object is sensed or not sensed, or may provide more detailed information, for example, the distance of the object from the presence sensor. The term "proximity detector" as used herein refers to a device or system including one or more presence sensors, generally including a processor for manipulating data provided by the presence sensor. A proximity detector may include logical circuitry for making a determination whether an object is present or whether an object is not present based upon the manipulated presence sensor data.

The term "flag" as used herein refers to a means for maintaining a logical Boolean state. For example, a flag may refer to a binary semaphore or Boolean variable. Examples of Boolean states include, but are not limited to, on/off, true/false, etc. The terms "set" and "clear" in reference to a flag refer to changing the state of the flag. Therefore, setting a flag typically indicates changing the a state of a flag to "on," or "true," while clearing a flag typically indicates changing the state of the flag to "off," or "false." For example, a flag may be used to determine a course of action in a logical flowchart, such as at a decision branch. However, persons having ordinary skill in the art will recognize additional mechanisms capable of serving as flags.

The term "pixel" as used herein refers to a single presence sensor sensing element. Each pixel may be configured to detect, for example, regions emitting different levels of infrared radiation within the detection field, the level of infrared radiation for each region, and the relative sizes of the regions.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

An exemplary embodiment of a range finding proximity detector includes a sensor element configured to detect infrared radiation emitted by objects within a detection area. The proximity detector may be configured to detect the temperature, relative size, relative position and relative distance of an object from the sensor. The proximity detector may be configured to set parameters for a controlled object based upon the detected size, temperature and proximity of an object in relation to one or more size thresholds, proximity thresholds, and/or temperature thresholds. More simply stated, controlled object parameters may be configured based upon whether the detected object is big enough, close enough, and/or warm enough. Additionally speed and/or direction of the movement of the object may be detected.

First Embodiment

A first exemplary embodiment of a range finding proximity detector includes a single pixel infrared (IR) sensor in communication with circuitry configured to process data from the IR sensor, and to communicate with a controlled device. The controlled device may be integrated with the range finding proximity detector, or may be external to the range finding proximity detector.

Figure 1:
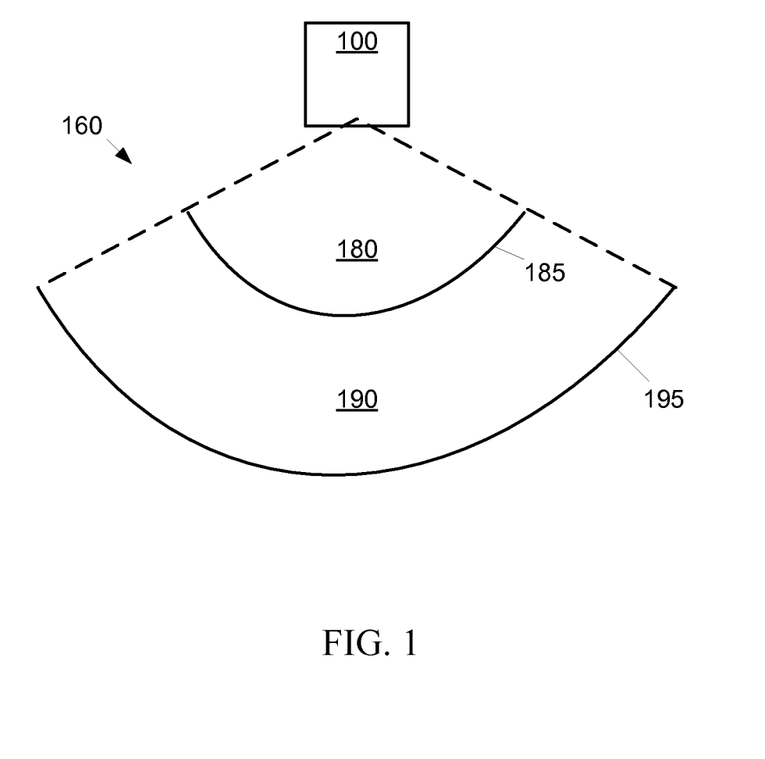
FIG. 1 is a schematic diagram of a detection area of a range finding proximity detector.

FIG. 1 is a schematic diagram of a range finding proximity detector 100 from a top view, indicating a front detection area 160 projecting outward from the range finding proximity detector 100. While the detection area 160 is depicted in FIG. 1 as covering an area defined by an arc, there is no objection to a detection area 160 having other shapes, for example, a circle or semicircle. A second threshold distance 195 bounds an outer edge of the detection area 160, and a first threshold distance 185 defines a boundary between a first zone 180 and a second zone 190 within the detection area 160. While the range finding proximity detector 100 may be able to sense objects beyond the detection area 160, the range finding proximity detector 100 may be configured to disregard objects beyond the detection area 160.

Figure 2A:
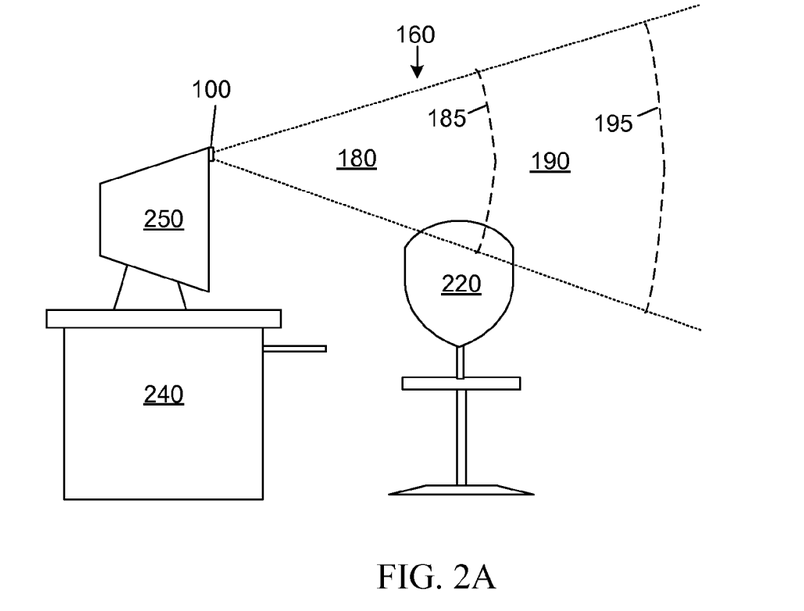
FIGS. 2A-2D are schematic diagrams of a first embodiment of a range finding proximity detector and scenarios of objects entering and departing a detection area.

FIGS. 2A-2D are diagrams of a controlled device 250 configured to respond to the range finding proximity detector 100. In FIG. 2A, the controlled device 250, a computer monitor in this example, is in an off state. A chair 220 is located within the first zone 180 of the detection area 160. However, since the chair is not a human and is therefore only at the ambient temperature of the room, it is desirable that the presence of the chair 220 in the detection area 160 of the range finding proximity detector 100 does not cause the range finding proximity detector 100 to change the state of the controlled device 250 to on.

Figure 2B:
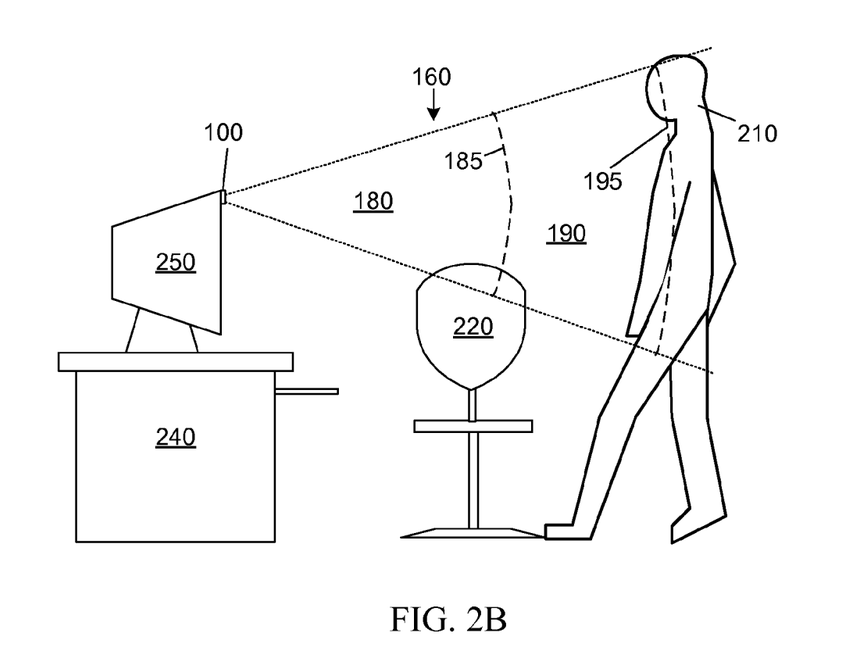

In FIG. 2B, a person 210 whose skin temperature exceeds that of the room, enters the second zone 190 of the detection area 160. However, it is unclear whether the person 210 intends to use the controlled device 250, so it is desirable that the mere presence of the person within the detection area 160 does not change the state of the controlled device 250.

Figure 2C:
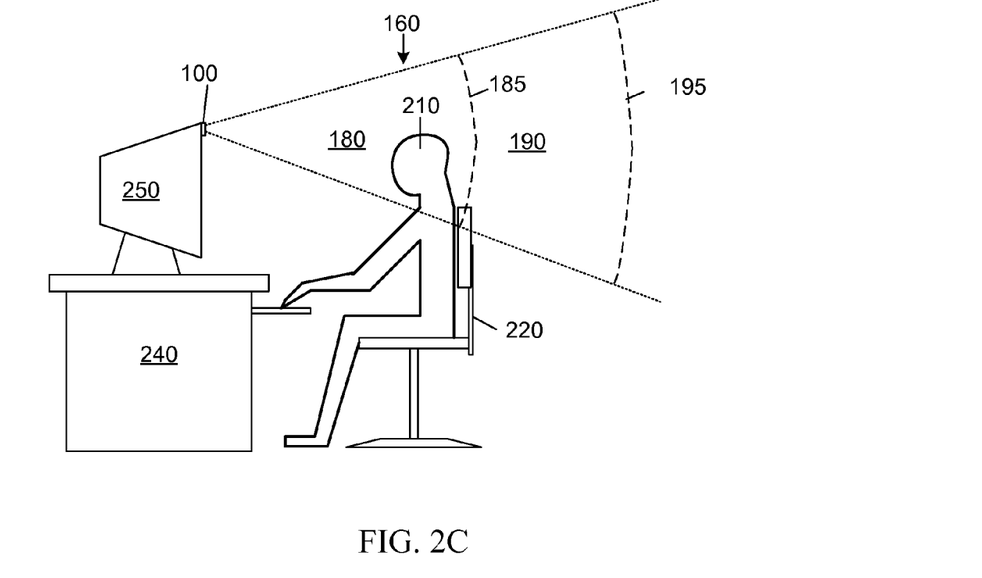

In FIG. 2C, the person 210 now sits down on the chair 220 in close proximity to the range finding proximity detector 100. In particular, the person 210 is now within the first zone 180. It is desirable that the closer proximity of the person 210 to the range finding proximity detector 100 should now trigger a change of state for the controlled device 250 to on. It should be noted that the mere presence of a cooler inanimate object, for example, the chair 220, within close proximity of the range finding proximity detector 100 does not trigger the range finding proximity detector 100 to change the state of the controlled device 250. The range finding proximity detector 100 may discern between a cooler inanimate object 220 and a warmer person 210, whether the person 210 is moving or not. In particular, the range finding proximity detector 100 may continue to detect the presence of a person 210 within the detection area 160 even if the person 210 is motionless for an extended period of time. The range finding proximity detector 100 may discern the difference between a person 210 and an inanimate object 220 within the detection area 160 by detecting the body heat of the person 210, for example, by detecting infrared radiation emitted by the person 210.

Figure 2D:
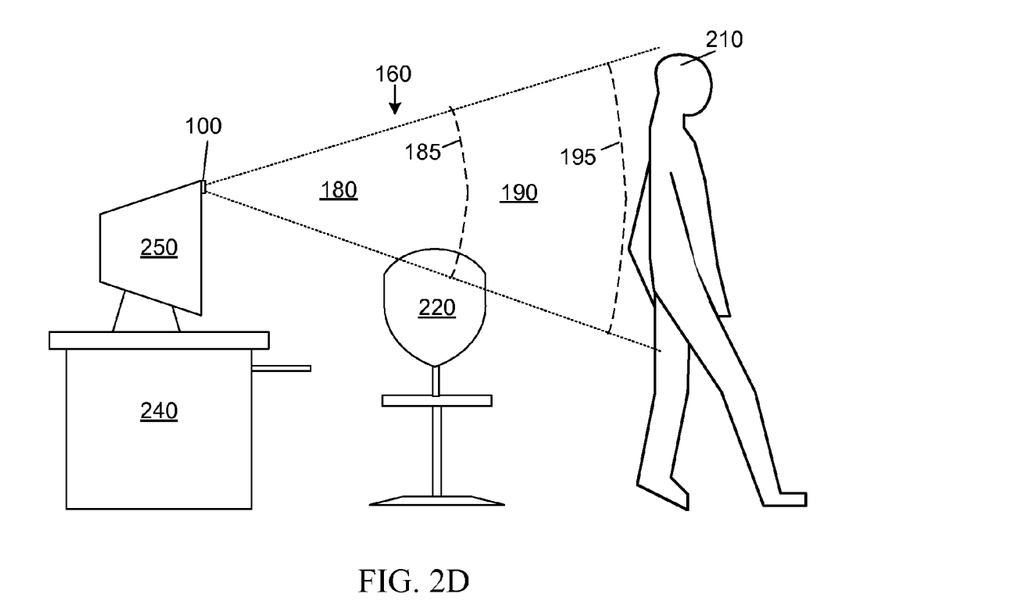

The controlled device 250 remains in the on state while the person remains within the first zone 180 and/or the second zone 190. The controlled device 250 is changed to the off state (often after a specific delay time) when a person 210 is no longer detected within the first zone 180 or the second zone 190 of the detection area 160, as shown in FIG. 2D.

While the detection area 160 is depicted as being substantially canonically shaped in FIGS. 1, 2A-2D, there is no objection to a range finding proximity detector 100 having other shapes, for example, but not limited to, a hemispherical shape.

The range finding proximity detector 100 may detect, for example, FAR infrared emissions in the 5 micrometer to 30 micrometer wavelength range. Two basic ranges of infrared include long-wave infrared and medium-wave infrared. Long-wave infrared (LWIR) sensors, sometimes called "far infrared," may operate at 8 to 12 micrometers and can see heat sources, such as human body heat, from a significant distance. The range finding proximity detector 100 may not measure the absolute temperature, but may generate an output voltage proportional to an average local temperature or temperature gradient. The range finding proximity detector 100 may further indicate how much of a field of view of a sensor pixel is filled by emissions from the heat source, by assuming (for example, but not limited to) a human body with normal body and skin temperature.

A range finding proximity detector, in general, may generate a signal with a voltage level proportional to the FAR emissions it receives. The level of received FAR emissions may depend on several factors, including the temperature of objects within the sensor detection area, the size of the objects, the distance of the objects from the sensor, and the ambient temperature within the detection area, among other factors. The size of the object may correspond to the amount of the detector pixel(s) or detection area occupied by emissions from the object.

Figure 3A:
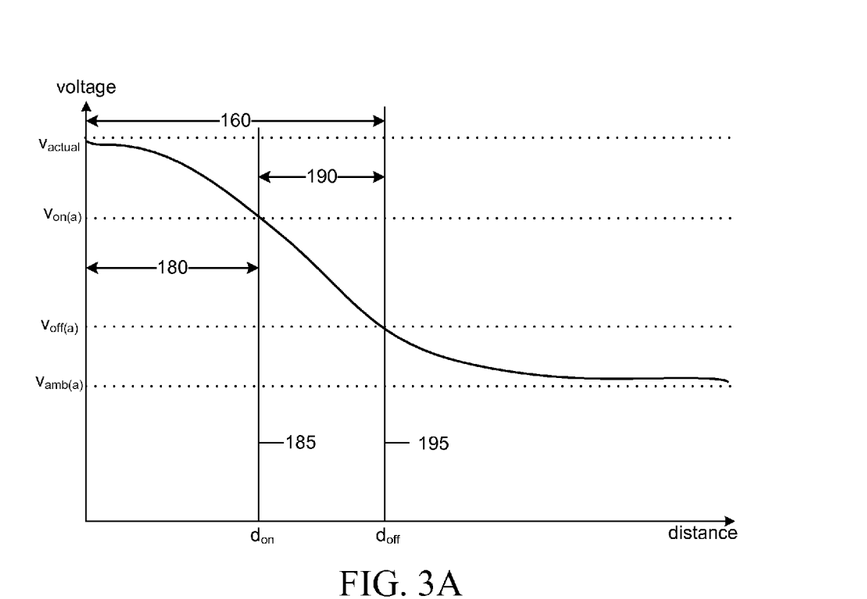
FIGS. 3A-3D are plots of three scenarios plotting the output voltage for a first embodiment of a presence sensor in a range finding proximity detector against the distance of a person from the sensor.

FIGS. 3A-3D plot the output voltage of a presence sensor against distance of an object from the sensor detecting a person within its detection area. The vertical axis represents the voltage or signal level output by the presence sensor. This signal might be in analog or in digital form. The voltage $v_{actual}$ indicates the voltage level of a person located immediately adjacent to the presence sensor. As the person moves farther from the presence sensor, the voltage level drops, as shown by the plot trace. FIG. 3A shows the plot of a first scenario for a presence sensor where the ambient temperature in the detection area is represented by $v_{amb(a)}$. In general, as the person moves farther away from the presence sensor, the output voltage of the sensor approaches $V_{amb(a)}$.

A first distance from the sensor $d_{on}$ is a "turn on" threshold, corresponding to the first threshold distance 185. The range finding proximity detector may be configured to turn on a controlled device when the voltage rises above a first voltage $v_{on}$, corresponding to the sensor voltage when a person moves closer than $d_{on}$ to the sensor. Conversely, when the person moves beyond a second distance $d_{off}$ from the presence sensor, corresponding to the second threshold distance 195, the range finding proximity detector 100 (FIG. 1) may be configured to turn off the controlled device by detecting when the presence sensor output voltage falls below $V_{off(a)}$.

It is generally desirable for $d_{off}$ to be greater than $d_{on}$. This supports the behavior that a person moving close to the presence sensor triggers the controlled device to be turned on, while a person, for example, walking past the presence sensor at a distance greater than $d_{on}$, does not trigger the controlled device to be turned on. By having $d_{off}$ greater than $d_{on}$, the controlled device may remain on while the person is within the range between $d_{off}$ and $d_{on}$, only turning off when the person moves further away than $d_{off}$. It should be noted that the controlled device may have more than two states (on and off). For example, if the controlled device is a light, the detected distance of a person may change the intensity of light continuously, or through a series of stepped intensities. Another example is detecting the distance of a person away from an audio source, so the volume level of the audio source is adjusted based on the distance of the person from the audio source, or the intensity of a lighted sign or billboard is brighter when a person is farther away from the sign, with the lighted sign turning off when the person moves far enough away.

In general, the distances where detection of a person triggers the controlled device to be turned off and turned on may be configured by determining the presence sensor output voltages corresponding to the distances of a person from the presence sensor. These voltages may vary depending upon the ambient temperature within the presence sensor detection area.

Figure 3B:
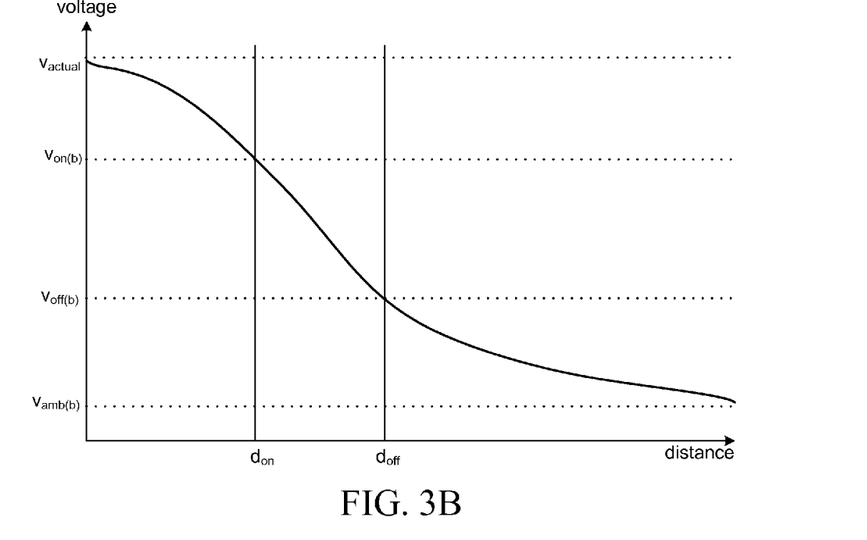

FIG. 3B is a plot of a second scenario similar to FIG. 3A, except the ambient temperature within the detection area, corresponding to a voltage $v_{amb(b)}$, is lower than the ambient temperature corresponding to the voltage $v_{amb(a)}$. In FIG. 3B, the voltage level drops lower as the person moves farther away from the presence sensor, and the voltage level $v_{on(b)}$ corresponding to the distance $d_{on}$ is lower than the voltage level $v_{on(a)}$ was for $d_{on}$ when the ambient temperature was higher. Therefore, the voltage levels triggering the controlled device are different based solely upon a difference in the ambient temperature of the detection area.

Figure 3C:
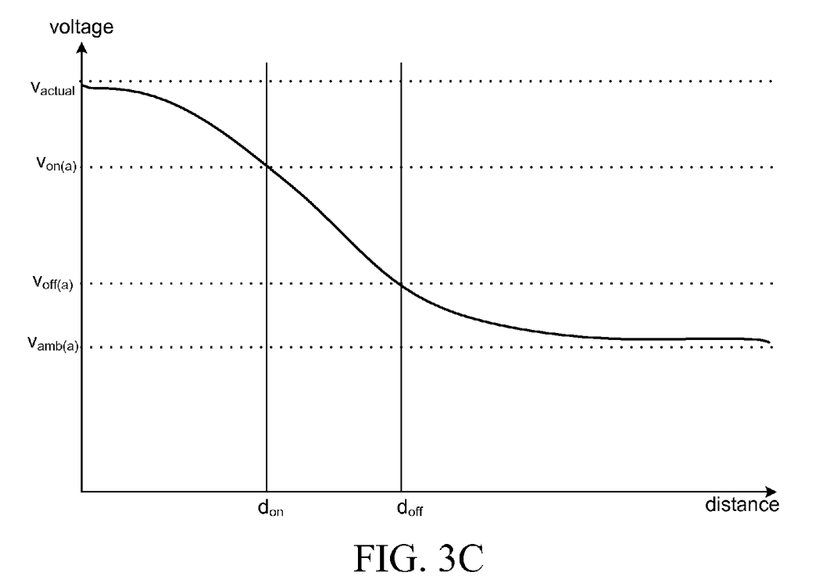
Figure 3D:
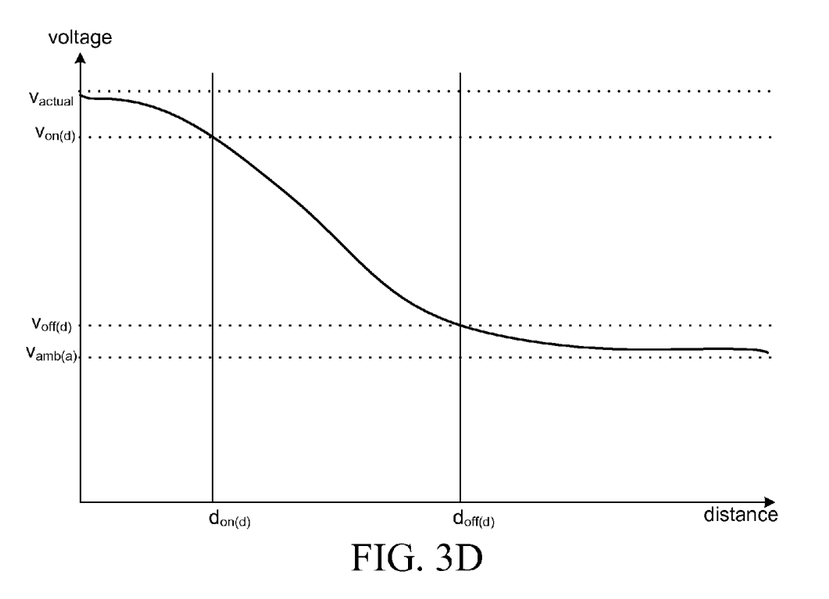

FIG. 3C replicates the first scenario shown in FIG. 3A for convenience. While the second scenario of FIG. 3B illustrates the effect of changing the ambient temperature while keeping $d_{on}$ and $d_{off}$ constant, FIG. 3D illustrates a third scenario where the ambient temperature remains constant from the first scenario, but $d_{on}$ and $d_{off}$ are changed. The controlled device is triggered on at a distance $d_{on(d)}$ closer to the presence sensor than $d_{on}$ and triggered off at a distance $d_{off(d)}$ farther from the presence sensor than $d_{off}$. By moving $d_{on}$ closer to the presence sensor, signified by $d_{on(d)}$, the corresponding voltage threshold $v_{on(d)}$ is raised, where $v_{on(d)}$ is higher than $v_{on(a)}$. By moving $d_{off}$ farther from the presence sensor, signified by $d_{off(d)}$, the corresponding voltage threshold $v_{off(d)}$ is lowered, where $v_{off(d)}$ is lower than $v_{on(a)}$.

Therefore, the voltage thresholds for a range finding proximity detector may depend upon the desired threshold distances from the presence sensor, and the ambient temperature within the detection area. The ambient temperature of the detection area may be detected by a sensor within the proximity detector, or more commonly, within the presence detector. It is common-place or envisaged that the thresholds would be dynamically adjusted in accordance with the ambient temperature, to maintain a specific proximity sensor behavior over a range of detector operating temperatures.

Second Embodiment

The discussion to this point regarding the first embodiment of the range finding proximity detector has assumed a range finding proximity detector having a single pixel radiation sensing element. A second exemplary embodiment of a range finding proximity detector includes a radiation sensing array with two or more radiation sensing element pixels in communication with circuitry configured to process data from the radiation sensing element, and to communicate with a controlled device. As with the first embodiment, under the second embodiment the controlled device may be integrated with the range finding proximity detector, or the controlled device may be external.

The second exemplary embodiment of a range finding proximity detector includes a pixel array configured to detect infrared radiation emitted by objects within a detection area. The pixel array may divide the detection area into multiple detection areas such that each pixel monitors a sub-area of the detection area. The pixel array may be one dimensional or two dimensional. Like the range finding proximity detector under the first embodiment, the range finding proximity detector under the second embodiment may be configured to detect the temperature, relative size, and relative distance of an object from the sensor. The range finding proximity detector may also be configured to set parameters for a controlled object based upon the detected size, temperature and proximity of an object in relation to one or more size thresholds, temperature thresholds, and proximity thresholds. In addition, under the second embodiment the range finding proximity detector may be configured to set additional parameters for a controlled object based upon the number of pixels detecting an object, and the geometric orientation of the pixels detecting the object. For example, in addition to sensing whether an object is big enough, close enough and warm enough, with a two dimensional pixel array, a parameter of the controlled device may be configured based upon whether the detected object is tall enough and/or wide enough, or at a specific position within the detection area.

In addition, parameters may be set and cleared based upon how many of the pixels are filled by a detected object. For example, it may be advantageous for a smart phone to be able to detect whether a warm object near the phone is a finger, where manipulation of the touch screen should be permitted via different movements or gestures, or a full human face, where manipulation of the touch screen should not be permitted. In this example, most or all sensor pixels may detect the face, whereas fewer pixels may detect the finger, so the range finding proximity detector may discriminate between the face and the finger, at least in part, by the number of pixels filled by the radiation from the face or finger. So for example, if the sensor detects a finger, the screen of the controlled device is illuminated, whereas if the full face is detected as determined by all pixels being illuminated, then the screen of the controlled device is dimmed, for example, to save power since the screen is so close the face as to be un-readable by the user.

Figure 4A:
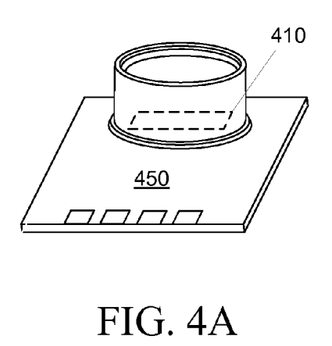
FIG. 4A is a schematic diagram of a range finding sensor element with a single pixel.

FIG. 4A is a schematic diagram of a sensor element for an exemplary range finding proximity detector according to the first embodiment. Sensor element 410 is affixed to a printed circuit board 450. The sensor element may be configured to detect infrared radiation levels emitted by a warm object. The printed circuit board may include circuitry to condition signals from the sensor element 410, for example, but not limited to, noise filters, voltage conditioners, amplifiers, and analog-to-digital converters.

Figure 4B:
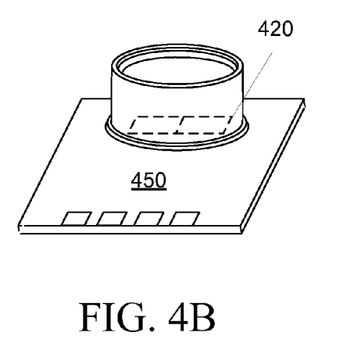
FIG. 4B is a schematic diagram of a range finding sensor element with a two pixel array.
Figure 4C:
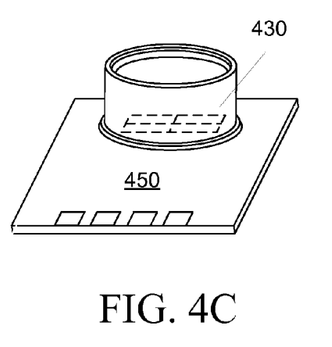
FIG. 4C is a schematic diagram of a range finding sensor element with a two dimensional pixel array.
Figure 4D:
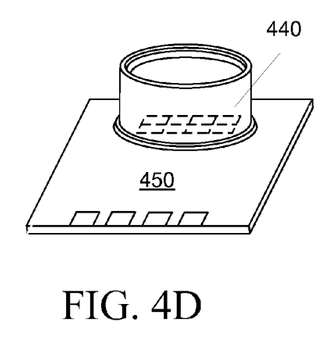
FIG. 4D is a schematic diagram of a range finding sensor element with a one dimensional pixel array.

FIGS. 4B-4D are schematic diagrams of sensor arrays for exemplary sensors as used within range finding proximity detectors according to the second embodiment. Sensor arrays 420, 430, 440 are each affixed to a respective printed circuit board 450. The sensor arrays 420, 430, 440 may be configured to detect infrared radiation levels emitted from a warm object. The printed circuit board may include circuitry to condition signals from the sensor element 410, for example, but not limited to, noise filters, voltage conditioners, amplifiers, and analog-to-digital converters. The printed circuit board 450 may also include circuitry to select one or more individual sensing elements in the sensor array 420, 430, 440.

FIG. 4B shows a sensor array 420 with two sensor elements. FIG. 4C shows a four element sensor array 430 in a 2×2 arrangement. FIG. 4D shows a four element sensor array 440 in a 1×4 arrangement. Of course, many other configurations are possible. It should be noted that as depicted by FIGS. 4A-4D, multiple sensor array elements share a common opening or lens in the sensor housing. However, there is no objection to embodiments where each sensor element has its own opening in the sensor array housing. It should further be noted that such sensors may be configured with, for example, lenses and/or reflectors and similar such components as are familiar to persons having ordinary skill in the art.

Returning to FIG. 3A, under the second embodiment, the voltages may represent, for example, the number of pixels detecting a human heat emission, or the total signal output from the arrays 420, 430, 440 (FIGS. 4B-4D). As such, a range finding proximity detector under the second embodiment may be suitable to applications calling for a more precise accuracy for the distance thresholds, or finer granularity for a greater number of distance thresholds. Sensors under the second embodiment may similarly use additional information from the number of pixels detecting human heat emissions to control additional parameters for the controllable device. For example, the on/off function of a light may be controlled entirely by the proximity of a detected human object to the sensor, while the intensity of the light may be controlled by the number of pixels detecting human heat emissions, indicating the distance or position of the human.

Third Embodiment

While the discussion of sensor array under the second embodiment has described multiple pixels within a single enclosure, there is no objection to a third embodiment of a pixel array where pixels are separated into two or more enclosures, and the enclosures are discretely located. The multiple enclosure array may share a processor between/among the multiple enclosures, for example, using wires, signal lines, or wireless communication, where each sensor element enclosure of the array communicates with the processor. The processor may be configured with information regarding the spacing and orientation of each of the sensor element enclosures in the array, for example, to determine one or more of the position, speed, and direction of an object sensed by one or more of the sensor elements. Of course, there is no objection a multiple enclosure sensor array having two or more processors in communication with the multiple enclosures and one another.

Under the third embodiment, the position of a detected object may be determined by recognizing which pixel or pixels within a sensor element array detect the object, and the relative locations of the pixels detecting the object. The position of the detected object may then be determined using methods known to persons having ordinary skill in the art, for example, triangulation. Determining a change of position over time of the detected object may provide for determination of the speed and/or direction of the detected object. In particular, the change of position may be detected as the detected object is detected by different pixels as the object moves toward one pixel and away from another.

Determination of the position, speed and direction of the object may also be assisted by determining the number of pixels in an enclosure that detect the object. For example, if an object is detected by three pixels located in a first enclosure, and one pixel located in a second enclosure, it may be assumed that the object is closer to the first enclosure than it is to the second enclosure.

The position, speed and direction of a detected object may be used to change parameters on a controlled device. For example, if the position of an object is determined to be within a predetermined positional range, a parameter for the controlled device may be modified. Similarly, if an object is determined to be traveling in a predetermined direction and/or at a predetermined speed, one or more parameters of the controlled device may be modified accordingly. The parameters of a controlled device may be, but are not limited to, states of the controlled device, for example, on and off.

Presence Detecting System

Figure 5:
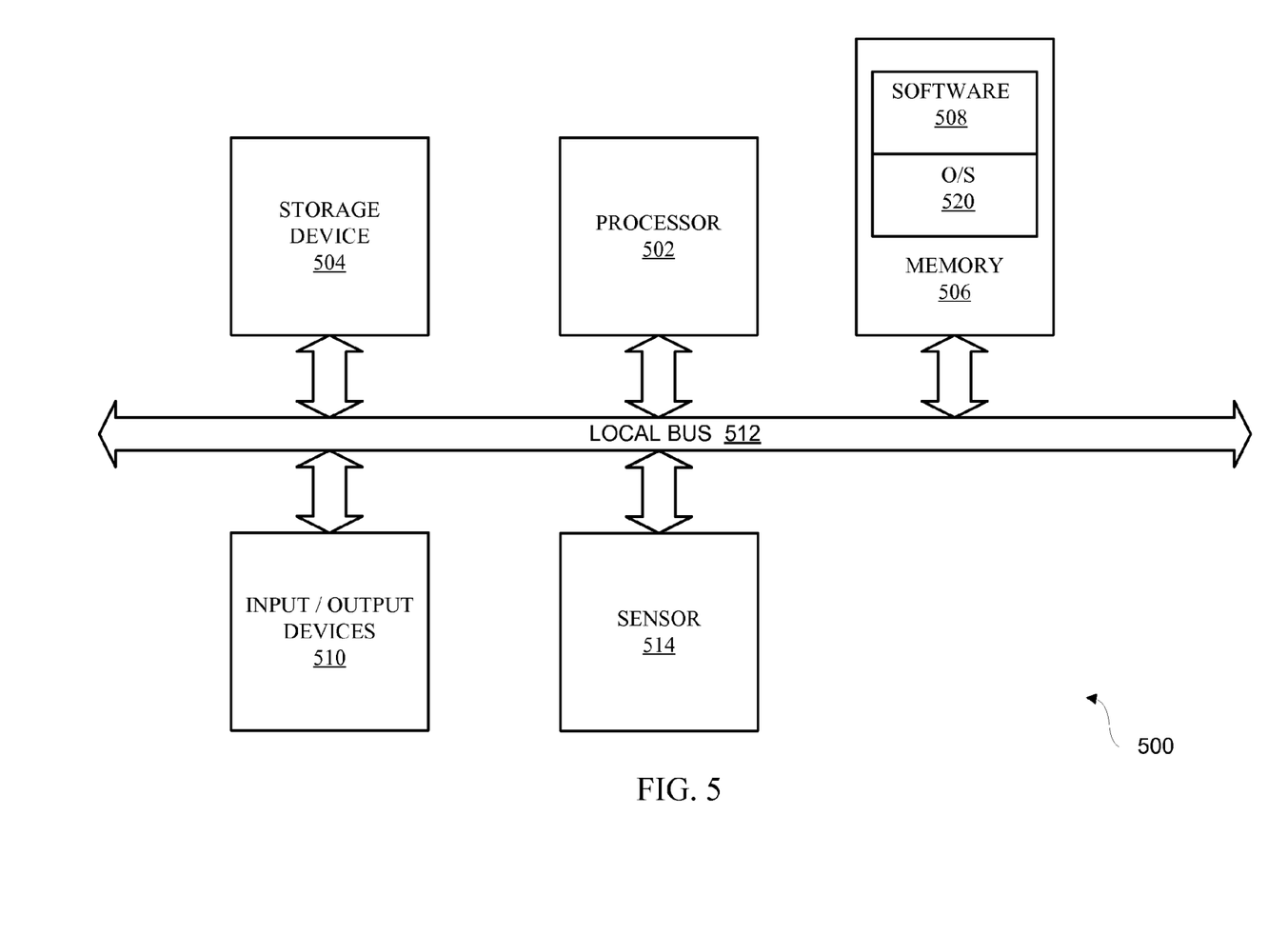
FIG. 5 is a schematic diagram of a computer system for detecting the presence of an object with a sensor.

FIG. 5 is a schematic diagram illustrating an exemplary embodiment of a system for executing functionality of the present invention. The present system for executing the functionality described in detail above may be an embedded microprocessor system, an example of which is shown in the schematic diagram of FIG. 5. The exemplary system 500 contains a processor 502, a storage device 504, a memory 506 having software 508 stored therein that defines the abovementioned functionality, input and output (I/O) devices 510 (or peripherals), a sensor 514, and a local bus, or local interface 512 allowing for communication within the system 500.

The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (0/S) 520. The operating system essentially controls the execution of programs within the system 500 and provides scheduling, input-output control, file and data management, memory management, and communication control and related services.

The I/O devices 510 may include input devices, or interfaces to external devices, for example but not limited to, a keyboard, mouse, scanner, microphone, etc. Furthermore, the I/O devices 510 may also include output devices or interfaces to external devices, for example but not limited to, a printer, display, etc. Finally, the I/O devices 510 may further include devices that communicate via both inputs and outputs, for instance, a controlled device as described above. Other examples include, but not limited to, a modulator/demodulator (modem; for accessing another device, system, or network), a radio frequency (RF) or other transceiver, a telephonic interface, a bridge, a router, or other device.

The sensor 514 may be, for example, an IR sensor. The sensor 514 may include a single element sensor, for example, as shown by FIG. 4A, or may include a sensor array including two or more sensor elements, as shown by FIGS. 4B-4D. A sensor array may include multiple sensor elements within a single enclosure, or may include multiple enclosures, wherein each enclosure includes two or more sensor elements. The sensor may be configured to detect only infrared radiation, or may be tuned to receive wider bandwidths. The sensor 514 may further include voltage regulation and noise reduction components. The sensor 514 may be configured for one of several orientations, for example, a front sensor or a top sensor. The sensor 514 may convey sensing parameters, for example, ambient temperature and the temperature of a sensed object, to the processor 502 via the local interface 512. Similarly, for an array sensor, the sensor 514 may convey parameters for each individual array element, or may send derived parameters collated from all of the individual array sensor elements. The sensor may also include an analog to digital converter to convert a received signal to a digital format. In addition, the sensor 514 may be configured to autonomously convey information, for example upon startup and when parameter changes are detected, or by sending periodic parameter reports. The sensor 514 may be configured to convey parameter information when queried or polled, for example, by the processor 502.

When the system 500 is in operation, the processor 502 is configured to execute the software 508 stored within the memory 506, to communicate data to and from the memory 506, and to generally control operations of the system 500 pursuant to the software 508, as explained above. It should be noted that in other embodiments, one or more of the elements in the exemplary embodiment may not be present.

Detection Methods

Figure 6:
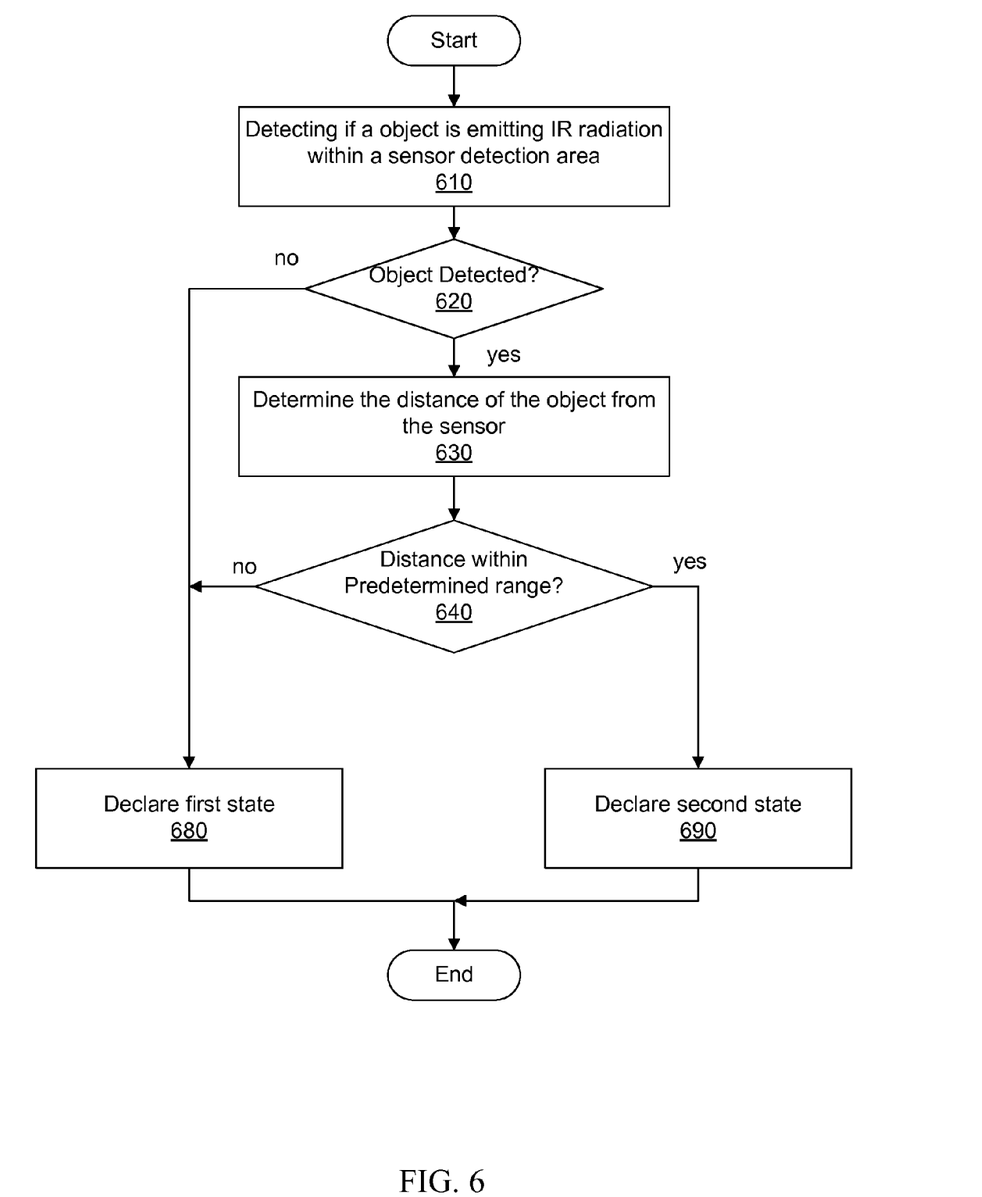
FIG. 6 is a flowchart of a first exemplary method for sensing the presence of a human within a detection area of a range finding proximity detector.

FIG. 6 is a flowchart of a first exemplary method for sensing the presence of a human within a detection area of a range finding proximity detector. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A signal, for example, from a passive infrared sensor, is received. As shown by block 610, the signal is examined to detect if an object is emitting infrared radiation within the sensor detection area. If an object is not detected, as shown by block 620, a first state is declared. The first state indicates that no object is detected by the infrared sensor. The state may be recorded in hardware and/or software, for example, by a software flag, a mailbox, a relay, or an entry in a state table. If an object is detected, a distance between the object and the sensor is determined, as shown by block 630. The distance may be calculated, for example, based on the amount of pixel coverage of a single pixel sensor, or the number of pixels showing pixel coverage in a sensor having a pixel array, as indicated, for example, by an output voltage of the sensor.

A determination is then made regarding whether the calculated distance is within a predetermined range (block 640). If the distance is not within a predetermined range the first state is declared, as shown by block 680 and described above. If, however, the distance is within the predetermined range, a second state is declared, as shown by block 690. The predetermined range may be, for example, a zone in front of the sensor where detection of a warm object is intended to trigger a response as indicated by the second state, for example, turning on an external controlled device such as, but not limited to, a light or a video monitor. In contrast, the first state may be used to indicate turning off the light or video monitor.

Figure 7:
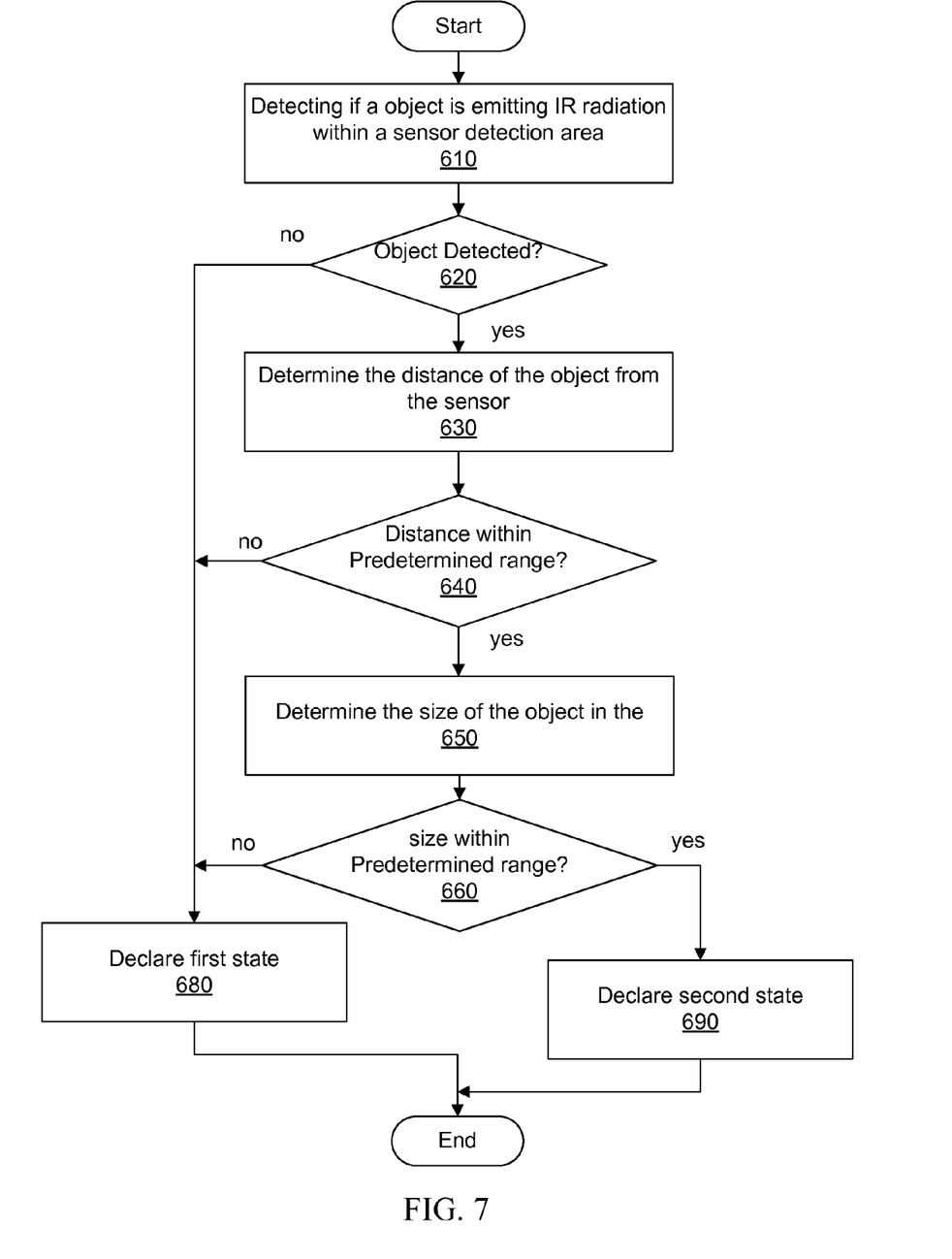
FIG. 7 is a flowchart of a second exemplary method for sensing the presence of a human within a detection area of a range finding proximity detector.

FIG. 7 is a flowchart of a second exemplary method for sensing the presence of a human within a detection area of a range finding proximity detector. The second exemplary method assumes means for determining the size of a sensed object, for example, by using a range finding proximity detector having an array of sensor pixels, as described above.

A signal, for example, from a passive infrared sensor, is received. As shown by block 610, the signal is examined to detect if an object is emitting infrared radiation within the sensor detection area. As shown by block 620, a determination is made regarding whether an object has been detected. If an object is not detected a first state is declared. The first state indicates that no object is detected by the infrared sensor. The state may be recorded in hardware and/or software, for example, by a software flag, a mailbox, a relay, or an entry in a state table. If an object is detected, a distance between the object and the sensor is determined, as shown by block 630. The distance may be calculated, for example, based on the amount of pixel coverage of a single pixel sensor, or the number of pixels showing pixel coverage in a sensor having a pixel array, as indicated, for example, by an output voltage of the sensor.

A determination is then made regarding whether the calculated distance is within a predetermined range (block 640). If the distance is not within a predetermined range, the first state is declared, as shown by block 680 and described above. If, however, the distance is within the predetermined range, the size of the object is determined, as shown by block 650. For example, it may be desirable to determine if a sensed object near a cell phone screen is a finger or a face, or if the object moving toward a video monitor is a human or a house cat. A determination is then made regarding whether the size of the object is within a predetermined range (block 660). If the size is not within a predetermined range, the first state is declared, as shown by block 680 and described above. Otherwise a second state is declared, as shown by block 690.

Figure 8:
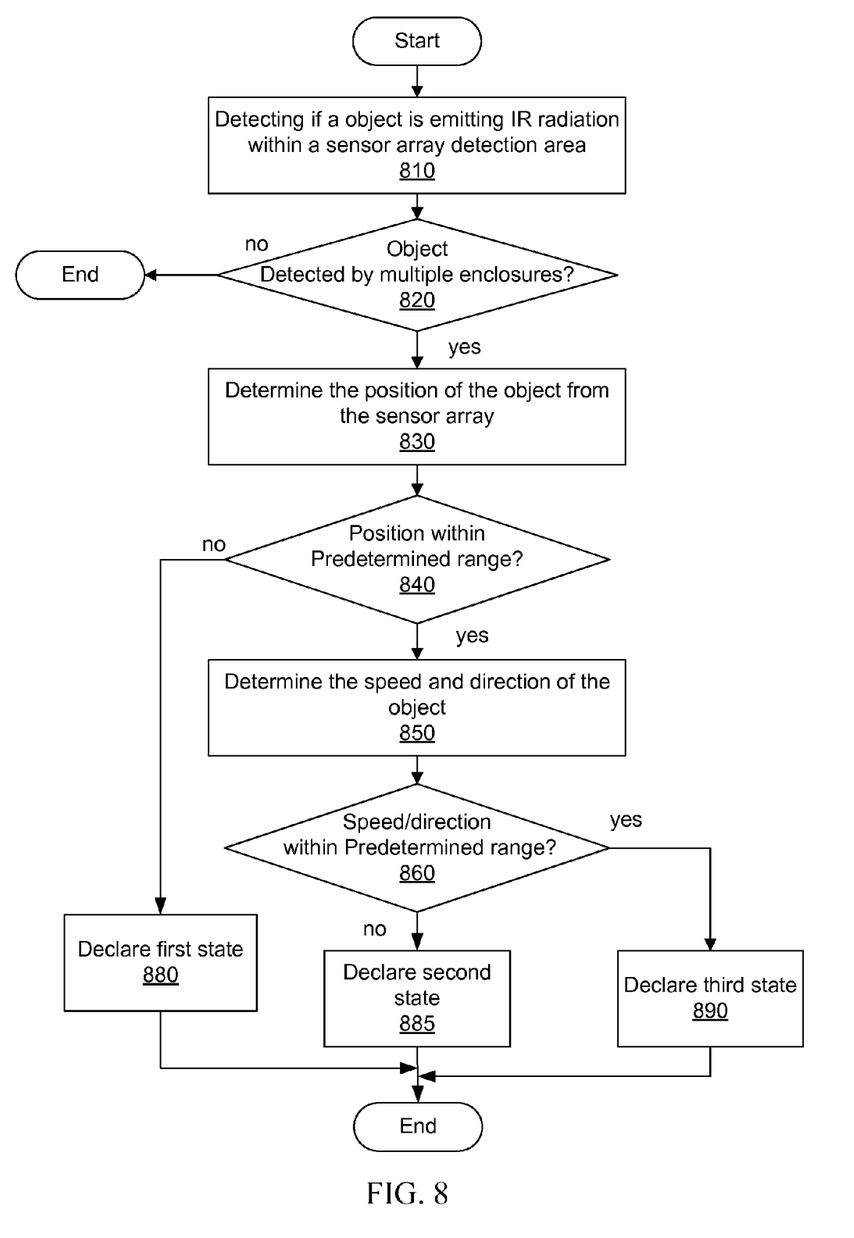
FIG. 8 is a flowchart of a third exemplary method for sensing the presence of a human within a detection area of a range finding proximity detector.

FIG. 8 is a flowchart of a third exemplary method for sensing the presence of a human within a detection area of a range finding proximity detector. The third exemplary method assumes means for determining the position of a sensed object, for example, by using a range finding proximity detector having an array of sensor pixels distributed among two or more enclosures, as described above.

A signal, for example, from a passive infrared sensor, is received. As shown by block 810, the signal is examined to detect if an object is emitting infrared radiation within the sensor detection area. As shown by block 820, a determination is made regarding whether an object has been detected by two or more enclosures. If an object is not detected the process ends. If an object is detected by multiple enclosures, a position of the object relative to the sensor array is determined, as shown by block 830. The position may be calculated, for example, based the relative distance between the object and each of the enclosures, as determined, for example, by the first exemplary method above, and the number of pixels showing pixel coverage in each enclosure, as indicated, for example, by an output voltage of the sensor.

A determination is then made regarding whether the calculated position is within a predetermined range (block 840). If the position is not within a predetermined range, a first state is declared, as shown by block 880. The first state indicates that no object is detected inside a positional range by the infrared sensor. The state may be recorded in hardware and/or software, for example, by a software flag, a mailbox, a relay, or an entry in a state table. If, however, the position is within the predetermined range, the speed and direction of the object, if any, is determined, as shown by block 850. For example, it may be desirable to determine if a sensed object near a cell phone screen, for example, a finger or a face, is moving toward or away from the cell phone screen, and how quickly. A determination is then made regarding whether the speed and/or direction of the object are within a predetermined range (block 860). If the speed and/or direction are not within a predetermined range for speed and/or direction, a second state is declared, as shown by block 885. Otherwise a third state is declared, as shown by block 890. Like the first state, described above, the second and third states may be used to determine parameters for a controlled object, The range finding proximity detector offers several improvements over the prior art. For example, a passive sensor requires less power to operate than emitter-detector systems. As an input only device, the passive sensor is less complex and costly than an emitter-detector system that must generate a signal, receive a reflection, and synchronize timing between the transmitted and received signal. In addition, with emitter-detector systems it is generally difficult to distinguish between an immobile person and an inanimate object. For example, if a person carries a box into the detection field of an emitter-detector style proximity detector, then leaves the box and departs, the emitter-detector system may not be able to distinguish the box from a person sitting down at the same location as the box and not moving. In contrast, the presently disclosed range finding proximity detector may distinguish the two scenarios by detecting the difference in temperature between a box and a person.

In summary, a passive range finding proximity detector device, system and method are presented. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A passive proximity detecting device for detecting an object within a detection area and controlling a controlled device, comprising:
a sensor comprising a plurality of pixels arranged in a substantially contiguous array, each pixel configured to detect infrared radiation emitted by the object in a predetermined temperature range within said detection area, and in response to detecting said object generating a detection signal having a signal level proportional to said infrared radiation emitted by said object received by said pixel; and
a processor in communication with said sensor, said processor configured to receive said detection signal, to derive a first object parameter and a second object parameter using, at least in part, a signal level of said detection signal from one or more of said plurality of pixels,
wherein said first object parameter comprises an object distance and said second object parameter is one of the group consisting of an object size, an object position relative to said sensor, an object speed, and an object direction of motion.

2. The proximity detecting device of claim 1, wherein said processor is further configured to determine if said second object parameter is within a predetermined second parameter range.

3. The proximity detecting device of claim 2, wherein said processor is further configured to perform a predetermined action if said second parameter is within said predetermined second parameter range.

4. The proximity detecting device of claim 2, wherein said predetermined action is configuring a parameter state of said controlled device.

5. The proximity detecting device of claim 2, wherein said second object parameter comprises said object size, and said second object parameter range comprises an object size range.

6. The proximity detecting device of claim 2, wherein said second object parameter comprises said object position, and said second object parameter range comprises an object position range.

7. The proximity detecting device of claim 2, wherein said second object parameter comprises said object speed, and said second object parameter range comprises an object speed range.

8. The proximity detecting device of claim 2, wherein said second object parameter comprises said object direction of motion, and said second object parameter range comprises an object direction of motion range.

9. A method for detecting an object in a detection area of an infrared sensor comprising an array of pixels, the method comprising the steps of:

receiving a signal from said infrared sensor comprising a signal level from one or more pixels of said array of pixels;
determining if said signal indicates detection of a warm object in a predetermined temperature range using, at least in part, a signal level of said signal proportional to infrared radiation emitted by said warm object received by said sensor; and
if said warm object is detected, determining a first object parameter and a second object parameter of said warm object from said sensor using, at least in part, said signal level,
wherein said first object parameter comprises an object distance and said second object parameter is one of the group consisting of an object size, an object position relative to said sensor, an object speed, and an object direction of motion.

10. The method of claim 9, further comprising the step of determining whether said second object parameter is within a predetermined second parameter range.

11. The method of claim 10, further comprising the step of performing a predetermined action if said second parameter is within said predetermined second parameter range.

12. The method of claim 11, wherein said predetermined action is configuring a parameter state of said controlled device.

13. The method of claim 10, wherein said second object parameter comprises said object size, and said second object parameter range comprises an object size range.

14. The method of claim 10, wherein said second object parameter comprises said object position, and said second object parameter range comprises an object position range.

15. The method of claim 10, wherein said second object parameter comprises said object speed, and said second object parameter range comprises an object speed range.

16. The method of claim 10, wherein said second object parameter comprises said object direction of motion, and said second object parameter range comprises an object direction of motion range.

17. The method of claim 9, further comprising the step of determining a number of pixels detecting said warm object.

18. The method of claim 17, further comprising the step of determining whether said number of pixels is within a predetermined pixel number range.

19. The method of claim 9, further comprising the step of performing a predetermined action if said number of pixels is within said predetermined pixel number range.

20. The method of claim 19, wherein said predetermined action is configuring a parameter state of said controlled device.

21. A system for sensing the presence of a warm object, comprising:
a passive infrared emissions sensor array comprising one or more pixels;
a processor in communication with said sensor; and
a non-transitory computer readable media configured to perform the steps of:
receiving a signal from said infrared sensor comprising a signal level from one or more pixels of said sensor array;
determining if said signal indicates detection of a warm object in a predetermined temperature range using, at least in part, a signal level of said signal proportional to infrared radiation emitted by said warm object received by said sensor; and if said warm object is detected, determining a first object parameter and a second object parameter of said warm object from said sensor using, at least in part, said signal level, wherein said first object parameter comprises an object distance and said second object parameter is one of the group consisting of an object size, an object position relative to said sensor, an object speed, and an object direction of motion.

22. A passive proximity detecting device for detecting a warm object within a detection area and controlling a controlled device, comprising:

a sensor comprising a plurality of pixels arranged in a substantially contiguous array, each pixel configured to detect infrared radiation emitted by said warm object in a predetermined temperature range within said detection area, and in response to detecting said object generating a detection signal having a signal level proportional to said infrared radiation emitted by said warm object received by said pixel; and a processor in communication with said sensor, said processor configured to receive said detection signal, and to derive a direction of motion of said warm object using, at least in part, a signal level of said detection signal at least two of said plurality of pixels.

23. A passive proximity detecting device of claim 22, wherein said processor is further configured to derive a direction of motion of said warm object based upon how many pixels are detecting said warm object.

24. A passive proximity detecting device of claim 22, wherein said processor is further configured to derive a direction of motion of said warm object based upon a geometric orientation of the pixels detecting said warm object.

25. A passive proximity detecting device of claim 22, wherein said processor is further configured to derive a direction of motion of said warm object based upon determining a change of position over time of said warm object.

* * * * *